United States Patent [19]

Mountz

[11] 4,095,147
[45] June 13, 1978

[54] WHEEL SLIP CORRECTION METHOD, SYSTEM AND APPARATUS

[76] Inventor: John M. Mountz, 1503 Windsor Dr., Arlington Heights, Ill. 60004

[21] Appl. No.: 661,509

[22] Filed: Feb. 26, 1976

[51] Int. Cl.² ............................................. H02P 5/50
[52] U.S. Cl. .......................................... 318/52; 291/2; 303/97; 180/82 R
[58] Field of Search ................ 318/52; 291/2; 305/61; 303/97; 180/82

[56] References Cited

U.S. PATENT DOCUMENTS

| 3,093,399 | 6/1963 | Smith | 291/2 |
|---|---|---|---|
| 3,437,896 | 4/1969 | Hoge | 318/52 |
| 3,560,759 | 2/1971 | Buehler et al. | 318/52 X |
| 3,790,871 | 2/1974 | Smith | 105/61 X |
| 3,912,034 | 10/1975 | Pallof | 318/52 |
| 3,997,822 | 12/1976 | Logston et al. | 318/52 |
| 4,035,698 | 7/1977 | Soderberg | 318/52 |

Primary Examiner—B. Dobeck
Attorney, Agent, or Firm—George H. Gerstman

[57] ABSTRACT

The following specification described a method or system of correcting locomotive wheel slip in which each driven wheel provides a wheel velocity signal proportional to its angular velocity. This signal is compared in a wheel slip detection circuit for each wheel with a train speed signal to derive a signal corresponding to the difference in the event of wheel slip. This difference signal is differentiated to provide a signal corresponding to the acceleration and multiplied by a signal corresponding to the slipping wheel speed to provide a correction signal corresponding to the power lost in the slipping wheel.

The wheel velocity signals are compared in a "less than" and a "greater than" circuit respectively to derive the train speed signal and the slipping wheel signal.

The correction signal is utilized for controlling the current in the field windings of the main generator of a diesel electric locomotive to reduce the power by a factor corresponding to the power lost in the wheel slip and to initiate the application of sand to the track in the event the train speed is low or the slip is repetitive.

An override relay is also operated by the correction signal to control the conventional override solenoid to reduce the generator output and thereby enable the governor to reduce the engine fuel supply.

The correction signal is also used for controlling the storage of the train speed signal to retain a record or memory of the train speed so that the correction signal is always properly derived irrespective of the number of slipping wheels.

17 Claims, 10 Drawing Figures

WHEEL SLIP CORRECTION METHOD, SYSTEM AND APPARATUS

FIELD OF THE INVENTION

This invention relates in general to a method, system and apparatus for detecting and correcting wheel slip and more particularly to an improved and versatile method or system employing economical apparatus for correcting railroad locomotive wheel slip.

SUMMARY OF THE PRIOR ART

Locomotive wheel slip occurs for a number of reasons including that resulting from the relationship between the applied power, track condition, train weight and train speed. In diesel electric locomotives, which are most commonly used today, the power is derived from a diesel engine. The engine drives an electric generator, which in turn furnishes electrical power to a number of electric traction motors. The traction motors each operate a respective wheel through an appropriate gear system and axle to move the locomotive or train.

When wheel slip occurs, the current drawn by the traction motor driving the slipping wheel falls due to the rise in the back emf and therefore the other traction motors start to draw additional power which is applied to their wheels. As the power applied to the other wheels goes up, each other wheel may go into a slip condition in a relatively short time, unless corrective measures are properly taken, as reasonably soon after a slip condition is detected, as possible. On the other hand, many slip conditions are, for example, at higher speeds self-correcting.

Corrective measures for eliminating wheel slip include reducing the power applied to the wheels and sanding the track to increase the friction between the track and wheels.

In the most commonly used wheel slip correction system, the current passing through the traction motors is sensed, since it changes rapidly in response to the acceleration of a slipping wheel. This acceleration is detected or sensed, as soon as the current passing through one traction motor falls relative to the others indicating a slip condition. Corrective measures, including dropping sand on the track to increase the traction and controlling the excitation of the main generator to drop the power to all motors are taken immediately to avoid a slip condition at the other wheels.

The initial detection of a slip condition by sensing the traction motor current is difficult due to the numerous transients present in such currents and once detected is corrected by reducing the power from the main generator to all the traction motors. Reducing the power to the traction motor of the slipping wheel prevents the system from thereafter properly detecting the condition of the slipping wheel, or wheels, since the lower power level applied to each traction motor in turn supplies a signal indicating that slip has been reduced. In essence, the slip signal is lost. Therefore, the power is immediately reduced substantially and when the traction motors are again drawing the same current, the power is reapplied from a relatively low level so that considerable power must be used to reestablish the original train velocity.

Attempts have been made to correct for the deficiencies of the just described system by comparing the accelerations of different wheels. This signal is usually unrelated to train speed or to the slipping wheel speed. Since the wheels may also momentarily change speed relative to each other in response to momentary changes in relative acceleration or deceleration the slip signal can also be lost. In any event, this system also simply reduces the power output to the traction motors and then simply reapplies the power when the wheel acceleration approaches zero without regard to actual locomotive condition.

When power to the traction motors is reduced, it is often done by controlling the bias of a transistor in the load regulator circuit or by controlling its emitter circuit. The transistor controls the excitation of the main generator, which responds by reducing the torque on the engine. The governor, however, can respond by supplying additional fuel to the engine when power is reapplied, so that the engine is operating at a higher power level than at the original slip condition. This may again drive the wheels into a slip condition.

Neither system therefore controls the power level in accordance with the particular slip condition or power setting of the engine to reduce the power accordingly and then monitor the slip condition to ensure that each slipping wheel is at or near train speed when power is reapplied.

Since many wheel slips are self-correcting, as they result from transient conditions, such as grease spots, track joints and the spring action of the train or track, the immediate correction of wheel slip results in unnecessary loss of power and the unnecessary deposit of sand. Both are expensive since efficiency is reduced by the need for repeated train reaccelerations and the sand application causes wear of moving parts and tends to plug or block the track ballast in addition to the sand loss.

SUMMARY OF THE INVENTION

In the present invention, the drawbacks of the prior art wheel slip detection and correction schemes are avoided through the technique of deriving a signal for each wheel proportional to the power lost by that wheel, if it should slip, and using that signal to continuously monitor and control the correction process for ensuring that the correction is complete and is accomplished with the minimum loss of power.

This is done by utilizing a wheel slip detection circuit for each wheel to derive a first signal proportional to the acceleration of a slipping wheel and multiplying that signal by a value or selected signal proportional to the wheel velocity to provide a correction signal corresponding to the power lost in the slipping wheel.

The correction signal is then used to control the excitation of the main generator accordingly for reducing the power by a factor corresponding to that lost in the slipping wheel, and the condition of the slipping wheel is continuously monitored so that the return of the wheel to train speed is known before power is returned to normal. In addition, the correction signal is utilized to energize the override solenoid for preventing the engine governor from compensating for the reduced power output and it is also used for initiating the application of sand to the track.

In order to derive the correction signal, each wheel is provided with a respective instrument or wheel sensing circuit which provides a dc output signal proportional to the respective wheel speed or angular velocity and this signal is applied to a respective or individually corresponding wheel slip detection circuit and to both a common fast wheel detecting circuit and to a common slow wheel detecting circuit. The fast wheel and slow wheel detecting circuits function as greater than and less than circuits respectively to provide a signal proportional to the fastest and slowest wheel speeds, respectively.

The signal from the slow wheel circuit corresponds to the locomotive or train speed and is also applied to each wheel slip detecting circuit, after passing through a delay and hold circuit, to provide a comparison between the train speed and the speed of each wheel. Since the acceleration of a slipping wheel is usually dependent on train speed, this comparison provides a signal reflecting the actual wheel condition, which is then differentiated to provide a signal corresponding to the wheel acceleration. Thus any differences between the signal of an accelerated wheel and the train speed represents the angular acceleration of the wheel when differentiated and this value is different for different train speeds and will usually be a smaller value at higher train speeds than at lower train speeds.

The signal representing angular acceleration is then multiplied by the signal from the fast wheel circuit after the latter signal has been passed through a gain programmer to derive a correction signal proportional to the power lost in the slipping wheel. This correction signal is in turn differentiated and inverted to provide a correction which is utilized for continuously controlling the excitation of the main generator for reducing power to that traction motor during either wheel slip or wheel slide.

The gain programmer is provided with a "greater than" circuit to maintain the fast wheel signal at a desired value at low speeds, when slipping wheel acceleration is high, to compensate for the load limiting feature of certain locomotives and this value may be selected as necessary.

The correction signal is proportional to the power lost in the slipping wheel and is applied to control the field winding current of the main generator to reduce power output in proportion to the power lost in the slipping wheel while the signal from the slipping wheel is continuously monitored and compared with train speed.

As the wheel slip is brought under control, the acceleration goes in a negative direction and goes through zero to a negative value as the slipping wheel decelerates back toward train speed. In order to maintain the correction signal, an inverting rate differentiating circuit is provided in the output of the multiplier and it responds to the multiplier output by maintaining the correction signal, until the multiplier output returns to normal indicating the slipping wheel is at train speed.

The delay and hold circuit is also controlled by a correction signal from any wheel slip detection circuit to retain the signal corresponding to the train speed. This train speed signal then serves as a reference signal in the event all wheels should go into a synchronous or simultaneous slip condition.

A sand control circuit is also provided for operation under control of the correction signal from the slip detecting circuits to provide sand to the track. When the train is at low speed, the delay and hold circuit transmits a signal to the sand control circuit for enabling the immediate deposit of sand in the event of wheel slip; however, when the slow wheel signal goes above a predetermined value indicating the train is travelling above a certain speed, the application of the correction signal for sanding is slightly delayed so that it must occur repetitively in order to provide sand. This, of course, avoids the unnecessary use of sand.

Since the duration of the wheel slip correction signal may vary widely, provision is made to hold the sand control circuit operated for a period long enough to ensure that the sanding solenoid dispenses sand even in the event that the correction signal level falls to a level below the initial operating value.

In addition, the present system utilizes the correction signal to operate an override relay, which operates the override solenoid for reducing the power requirements of the engine. Operation of the override solenoid is practical in the present system since the condition of the slipping wheel is accurately monitored.

It is therefore among the objects of the present invention to provide an improved method and/or system for use in correcting wheel slip in locomotives or the like.

It is another object of the present invention to provide a method or system of improved versatility, which can be utilized for controlling wheel slip in a wide variety of locomotives.

It is a further object of the present invention to provide an economical system or apparatus for use in controlling locomotive wheel slip.

Other objects and features of the present invention will become apparent by examination of the following specification and claims together with the drawings.

GENERAL DESCRIPTION OF THE PREFERRED EMBODIMENT OF THE INVENTION

Figure 1:
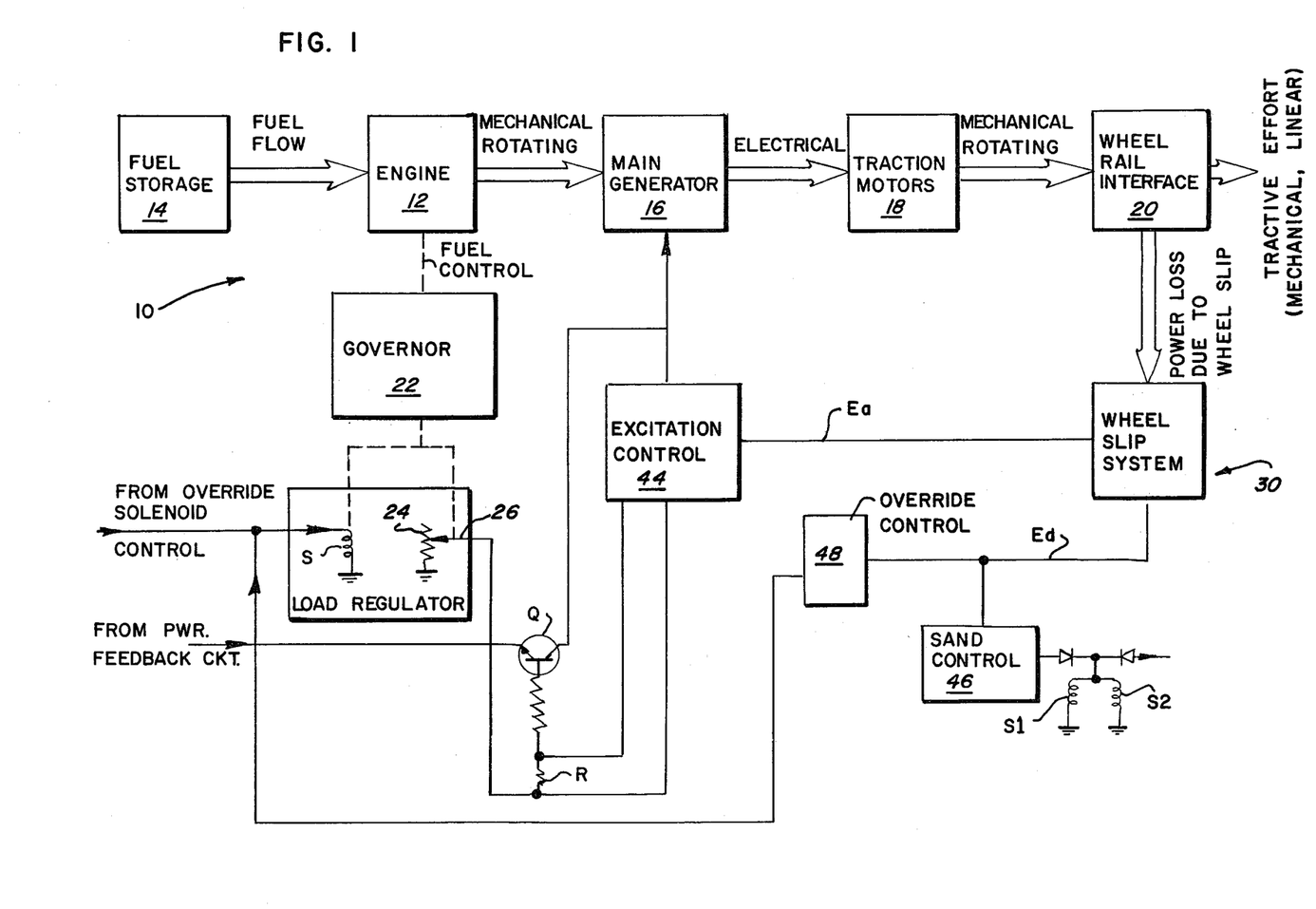
FIG. 1 is a block diagram illustrating a typical diesel electric locomotive drive arrangement in which the principles of the present invention are employed.

In FIG. 1 a block diagram of a typical diesel electric locomotive power system used, for example, in a GM Electromotive type GP 40 locomotive, is indicated by the reference character 10. The system includes a diesel engine 12, which is supplied with fuel from a source 14 to drive a main generator 16. The main generator 16 in turn supplies electrical power to each of a plurality of traction motors 18. The traction motors 18 drive respective wheels through respective gear trains and axles. Usually four traction motors are provided although as many as six or more may also be used; however, it will be understood the present system is not limited to the number of traction motors or wheels discussed herein nor is it limited to diesel electric locomotives but may advantageously be applied to a wide variety of vehicle power sources including electric locomotives.

The traction motors 18 drive the wheels over the track at a speed dependent on one of a plurality of power settings selected by the train engineer and such factors as train weight, track grade and the friction developed at the wheel rail interface indicated by the box 20. The horse power HP delivered by the engine 12 is determined by the revolutions per minute or rpm × torque T. A conventional governor 22 is provided to regulate the fuel supply to the engine in accordance with the power setting selected by the engineer so that the engine delivers a constant rpm and the governor also controls a load regulator potentiometer 24 by means of a wiper arm 26 to control the current through the field windings of the main generator to maintain a constant torque T on the engine. The wiper arm 26 is usually hydraulically operated by the governor to set the bias level at the base circuit of a transistor Q through a resistor R and the emitter circuit is controlled by a power feedback circuit to control the load. At lower speeds as, for example, 23 mph or less, the governor maintains the wiper arm 26 at a maximum position in which the field current of generator 16 imposes a selected maximum load on the engine. This prevents the engine from transmitting excess power to the generator as the governor tries to supply added fuel to the engine in accordance with the selected power setting. This is a power limiting feature provided to prevent an excess of available power Pa from being transmitted to the wheel rail interface 20 where it may create wheel slip, since the tractive effort Pte between the track and wheels has a maximum or limit, which is below the available power Pa, and this tends to create wheel slip.

The wiper arm 26, which controls transistor Q, may also be under hydraulic control of an override solenoid S, which is optionally operable in response to certain override conditions to control the main generator field windings and to override the governor control of the engine fuel supply.

It will be appreciated that the power required to maintain the train in motion or to accelerate the train is dependent on the power transmitted through the wheel rail interface 20 to the track and this power is generally referred to as the power that produces tractive effort Pte. Therefore for any particular power setting, the available power Pa of the locomotive axle has the following relationship to tractive effort Pte of that axle:

$$Pa - Pte = uWr\Omega s + I\Omega a \frac{d\Omega s}{dr}$$

where $u$ is the coefficient of fraction; $W$ the weight or force normal to the track wheel interface; $r$ the wheel radius; $\Omega s$ is the wheel slip velocity which is the difference in wheel rim velocity and the train or locomotive velocity; $I$ the moment of inertia of the traction motors and associated gearing and shafts; $\Omega a$ the rotational velocity of the wheel or axle, and $$\frac{d\Omega s}{dt}$$

the rate of change of the wheel slip velocity or acceleration. Thus if the locomotive or train is operating normally both sides of the equation are zero since all of the available power Pa is expended in tractive effort Pte or Pa=Pte and the wheels rotate synchronously with the movement of the locomotive.

When a slip condition occurs in which the rotating wheel is moving independently of the train movement or without moving the train the available power Pa is larger than the tractive effort Pte or Pa > Pte. This excess of power Pa over Pte appears in angular acceleration of one or more of the wheels as indicated by an increase or change in the value of $$I\Omega a \frac{d\Omega s}{dt}.$$

The power lost in the wheel slip at the initiation of wheel slip before the slip velocity rises above train speed is therefore:

$$Pws\ (t = 0) = I\Omega a \frac{d\Omega s}{dt}.$$

Figure 2:
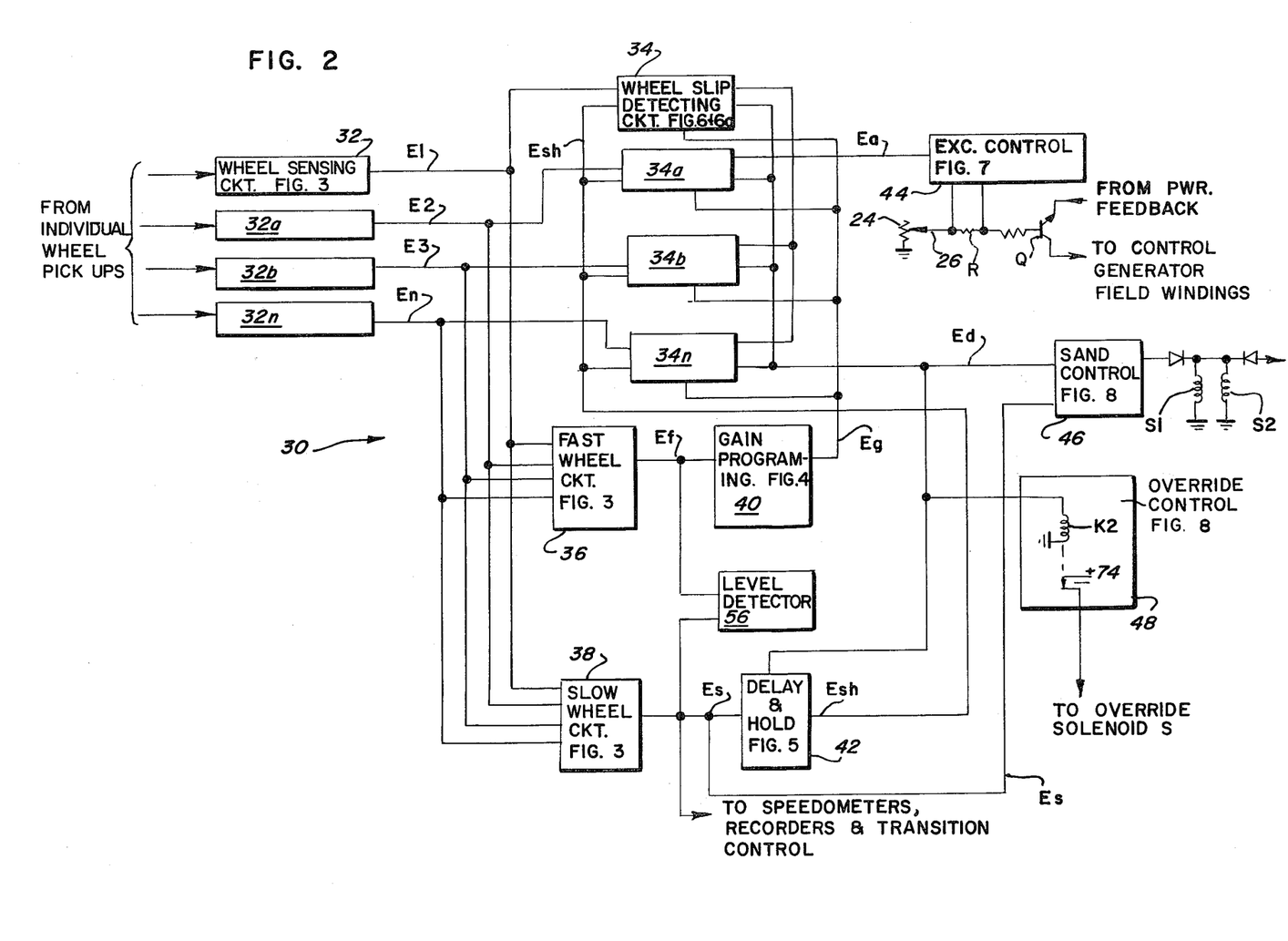
FIG. 2 illustrates a system in block form employing the principles of the present invention for correction of locomotive wheel slip.

The wheel slippage can therefore be corrected by reducing the power of the engine by an amount proportional to the term $$I\Omega a \frac{d\Omega s}{dt}$$

and the method of the present invention enables a determination of the value of this term and applies a signal corresponding or proportioned thereto for the correction of wheel slip. Basically the present invention employs a wheel slip system generally indicated at 30 in FIGS. 1 and 2 for determining the value of the power lost in wheel slip and the system 30 includes certain auxiliary control features which facilitate its use with a wide variety of different types of locomotives.

As seen in FIG. 2, the system 30 includes a plurality of wheel velocity sensing circuits 32–32n each individual to a respective wheel or axle; a fast wheel or axle detection circuit 36; a slow wheel or axle detection circuit 38; a gain programmer 40 and a delay and hold circuit 42. In addition the system employs an excitation control 44 for use with a typical diesel electric locomotive of the type described; a sand control circuit 46 for use in most types of locomotives and an override solenoid control circuit 48.

Figure 3:
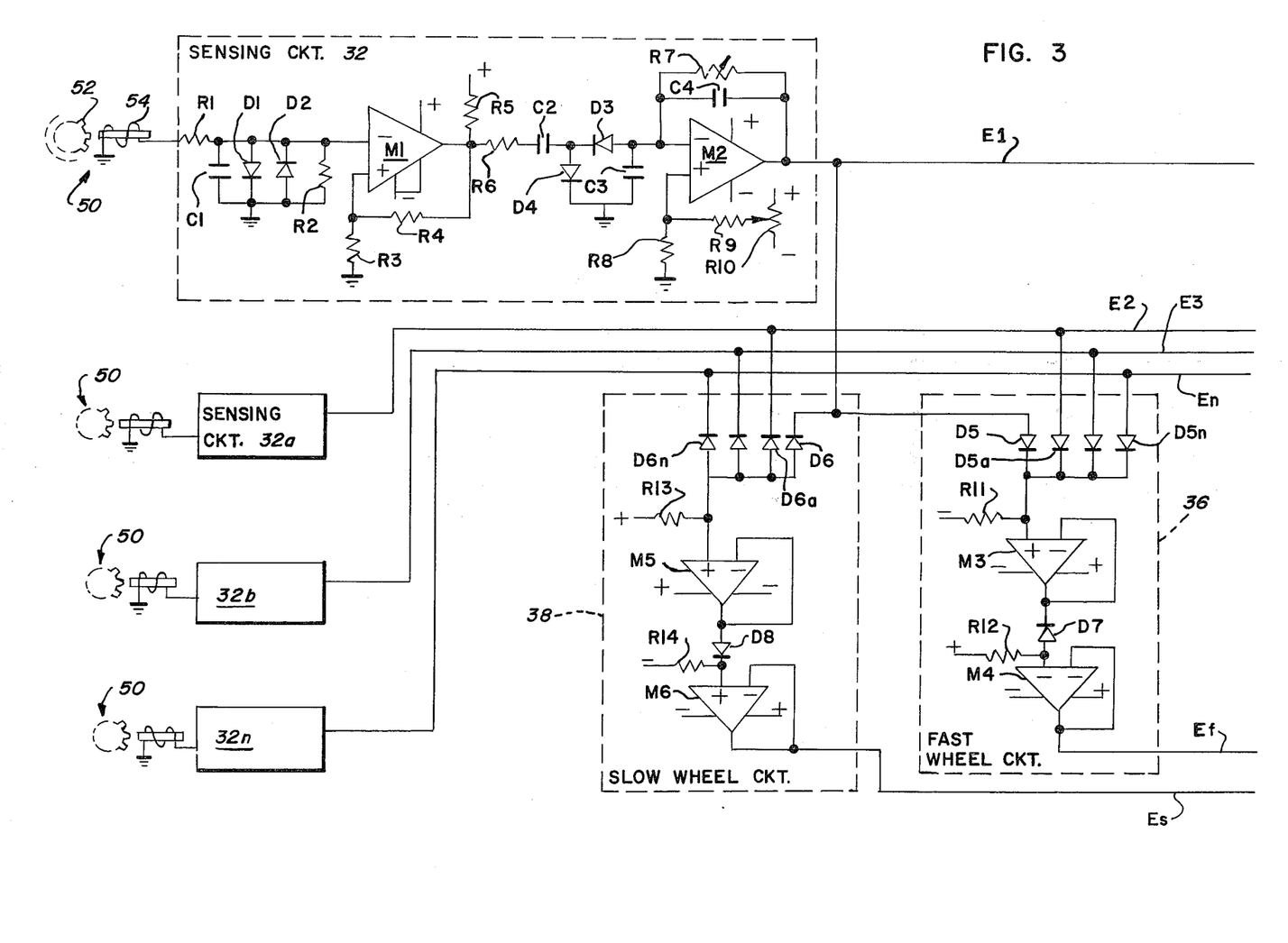
FIG. 3 illustrates a circuit arrangement utilized for sending wheel speed together with a fast wheel and a slow wheel detecting circuit.

Briefly, each sensing circuit 32–32n functions as a frequency to voltage converter and comprises a pair of tandemly connected operational amplifiers M1 and M2 as seen in FIG. 3. Each amplifier M1 functions as a zero crossing detector and each amplifier M2 functions as an integrator and are conventional integrated circuits of, for example, types LM311N or LM741N sold by the National Semiconductor Co. Unless otherwise indicated this type of integrated or similar circuit is used generally throughout the system 30. One input to each amplifier M1 is supplied by a sine wave signal generated by a magnetic pickup assembly 50 provided for the axle of the wheel individually corresponding to the respective sensing circuit 32–32n.

The sine wave signal is generated by the teeth of a gear 52 which may be mounted to rotate with the axle or one of the gear shafts between the traction motor 18 and its respective axle and wheel. The teeth of the gear, which are chosen in this example as 60 in number, rotate past the core of a pick-up coil 54 to generate pulses in the coil at a rate corresponding to the respective wheel speed, and the coil in turn transmits these pulses through resistor R1 to one input of the respective amplifier M1 and an integrating capacitor C1 having oppositely poled diodes D1 and D2 and a resistor R2 in shunt therewith. The other input to amplifier M1 is connected between the junction of resistors R3 and R4 with resistor R3 connected to ground and resistor R4 connected to the output terminal of amplifier M1. Resistors R3 and R4 are also connected to battery through resistor R5 at the output terminal of amplifier M1 and set the threshold level of amplifier M1 at substantially 30 mv to eliminate noise. The output of amplifier M1 is a series of square waves of the same frequency as the input extended through a differentiating circuit comprising resistor R6 and capacitor C2 for deriving equal area pulses. The negative going portion of the differentiated pulse is passed through a diode D3 to capacitor C3 and to one input of integrating amplifier M2 while diode D4 shuts the positive portion of the pulse to ground.

An RC circuit comprising a calibrating variable resistor R7 and capacitor C4 which have a relatively long time constant are connected between the input and output of amplifier M2. Amplifier M2 provides an inverted or positive dc output voltage. The output voltage is proportional to wheel speed and in this case the dc voltage rises with rising wheel or axle speed as the input level to amplifier M2 goes more negative with increasing speed. As an example with gear 52 having 60 teeth and rotating at 840 rpm equivalent to a train speed of 100 mph with a wheel of 40 inches diameter, the output from amplifier M2 is selected to provide 10 volts. The other terminal of amplifier M2 is connected to a voltage divider comprising resistors R8 and R9 and a variable resistor R10 to zero or null the amplifier M2. The output from each wheel sensing circuit 32 provided by the respective amplifier M2 is extended over a respective lead E1-En to individually corresponding wheel slip detecting circuit 34-34n seen in FIGS. 6 and 6a and to an individually corresponding diode D5-D5n in a fast wheel detecting or selecting circuit 36 and to an individually corresponding diode D6-D6n in a slow wheel detecting or selecting circuit 38.

The diodes D5-D5n are poled oppositely to diodes D6-D6n and negative battery is connected through a resistor R11 to the cathodes of diodes D5-D5n, which are connected in common to the positive input of a buffer amplifier M3 in the fast wheel circuit 36, and this amplifier feeds a second buffer amplifier M4 through a negatively poled diode D7 connected to positive battery through resistor R12 at the respective input terminal of amplifier M4.

The anodes of diodes D6-D6n are connected in common to one input of a buffer amplifier M5 and to positive battery through a resistor R13 at the slow wheel circuit 38 and the output of amplifier M5 is connected through a positively poled diode D8 to one input of a buffer amplifier M6, which is connected to negative battery through resistor R14.

Therefore whenever leads E1-En go positive the potential at the input terminal of buffer amplifiers M3 and M5 will go positive by a corresponding value less the potential drop across the respective diodes D5-D5n and D6-D6n. If one of the wheel sensing circuits such as 32 provides a higher positive output than the others, this voltage less the diode drop is transmitted through the respective diode D5 to amplifier M3, while the voltage at the junction of resistor R13 and diodes D6-D6n will remain at the potential of the other leads E2-En less the drop across the respective diodes for controlling amplifier M5 to provide an output corresponding to the normally operating wheels or train speed. The outputs of amplifiers M3 and M5 are transmitted through respective tandem connected buffer amplifiers M4 and M6 with resistors R12 and R14 together with diodes D7 and D8 serving to compensate for the diode drop across diodes D5-D5n and D6-D6n respectively.

Thus the output of amplifiers M4 and M6 is a positive dc voltage normally rising with increasing train speed or velocity, and when one of the wheels operates faster than the others due to a slipping wheel, the output of amplifier M4 goes above the output of amplifier M6 which supplies an output corresponding to normal wheel or train speed. Thus the fast wheel or axle detection circuit 36 functions as a greater than circuit to select the signal proportional to the fastest wheel and the slow wheel or axle detection circuit 38 functions as a less than circuit to select a signal proportional to the slowest wheel, which of course is operating at a rate corresponding to train or track speed, unless it locked.

The output from amplifier M4 and the fast wheel circuit 36 is extended over lead $E_f$ to the gain programmer 40 and the output from amplifier M6 and the slow wheel circuit 38 is extended over lead $E_s$ to the delay and hold circuit 42 and to the sand control circuit 46. A conventional level detector indicated at block 56 in FIG. 2 is connected between leads $E_f$ and $E_s$ and lead $E_s$ is also connected to the conventional speed recorders and/or train speedometers. The level detector 56 is provided to detect a difference in potential exceeding a predetermined value corresponding to, for example, 10 mph between leads $E_f$ and $E_s$ or a locked wheel condition and power to the locomotion is terminated in that event. It will be noted that in the event of a locked wheel condition the potential on one of leads E1-En drops to zero and therefore the potential at the input of amplifier M5 moves in a negative direction to reduce the output signal on lead $E_s$ while the output voltage on lead $E_f$ remains high to enable operation of the level detector 56.

Figure 4:
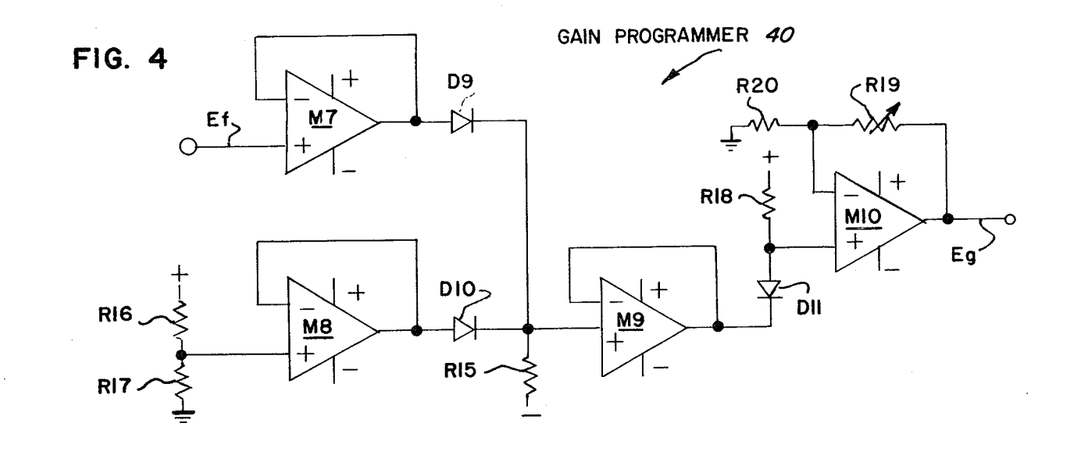
FIG. 4 illustrates a gain programmer.

The gain programmer 40 comprises a pair of the integrated circuit buffer amplifiers M7 and M8 each of which feed the positive input of a buffer amplifier M9 through a respective positively poled diode D9 and D10 to control the potential supplied to the input of amplifier M9 through the resistor R15 from negative battery. The output of amplifier M8 is set by a voltage divider comprising resistors R16 and R17 connected across the positive input terminal of the amplifier M8 so the output of amplifier M8 is a constant value selected in accordance with the type of locomotive on which it is used to provide an output which compensates for the aforementioned power limiting feature used on some locomotives. Amplifier M9 thus functions as a greater than circuit and feeds the positive input terminal of a non-inverting amplifier M10 through a negatively poled diode D11 connected to positive battery through a resistor R18.

The output of amplifier M7 rises and falls with the input signal or voltage on lead Ef from the fast wheel circuit 36. When the signal on lead Ef goes positive by an amount sufficient to render the output of amplifier M7 greater than the output of amplifier M8, the output of amplifier M9 alters to change the input level at the positive input terminal of amplifier M10 through diode D11. The potential at the negative input terminal of amplifier M10 is controlled through a variable resistor R19 connected between the output and negative terminals of amplifier M10 and a fixed resistor R20 connected to ground for controlling the gain of amplifier M10. The output of amplifier M10 is applied over lead Eg in common to each wheel slip detecting circuit 34–34n and below the level at which the output of M7 goes above the output of M8, it is a constant value as shown by the portion of graph a marked Eg in FIG. 9.

Figure 5:
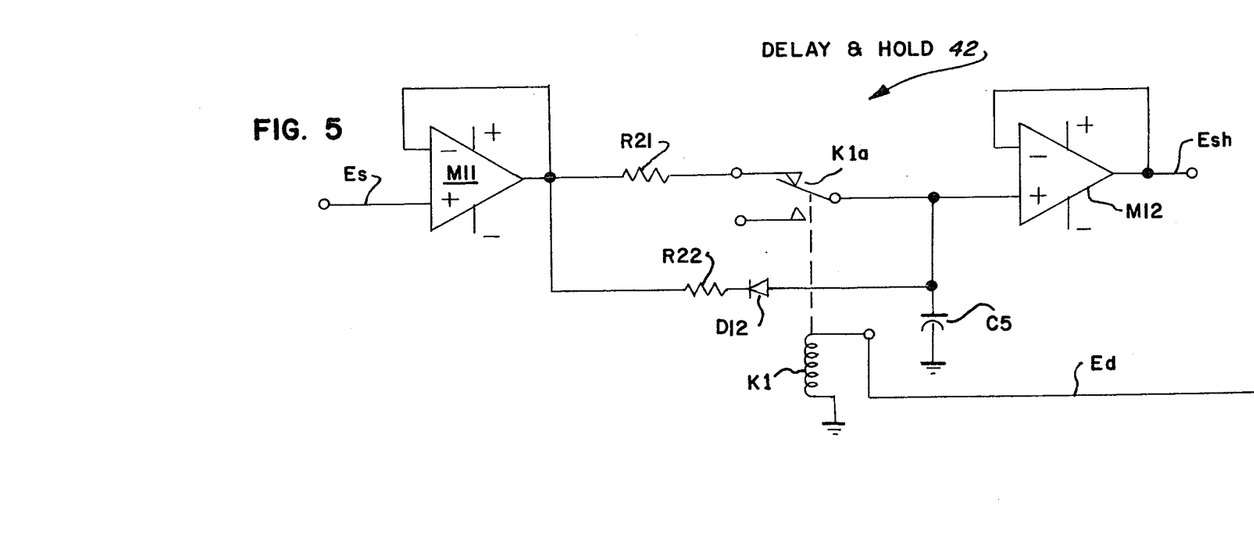
FIG. 5 illustrates a delay and hold circuit.

The delay and hold circuit 42 comprises a first buffer amplifier M11, which receives the signal from the slow wheel circuit 38 corresponding to the track or train speed over lead Es and transmits the signal to the input of a buffer amplifier M12 through a delay circuit comprising resistor R21 and a capacitor C5. Amplifier M12 is an integrated circuit of the type LM308N sold by National Semiconductor Co., and its output is extended over lead Esh to each wheel slip detection circuit 34–34n. The delay circuit formed by resistor R21 and capacitor C5 provides a delay of substantially two or more seconds to delay the output on lead Esh in the event all wheels should start to slip and the input signal on lead Es rises rapidly. The delay is long enough to permit relay K1 to operate for opening contacts K1a between resistor R21 and capacitor C5 so that capacitor C5 functions as a memory to store the signal or charge corresponding to the train speed. A diode D12 and resistor R22 are also provided for capacitor C5 to enable discharge of the capacitor in the event of a locked wheel condition since the output from the circuit 38 and amplifier M11 then falls to zero.

Figure 6:
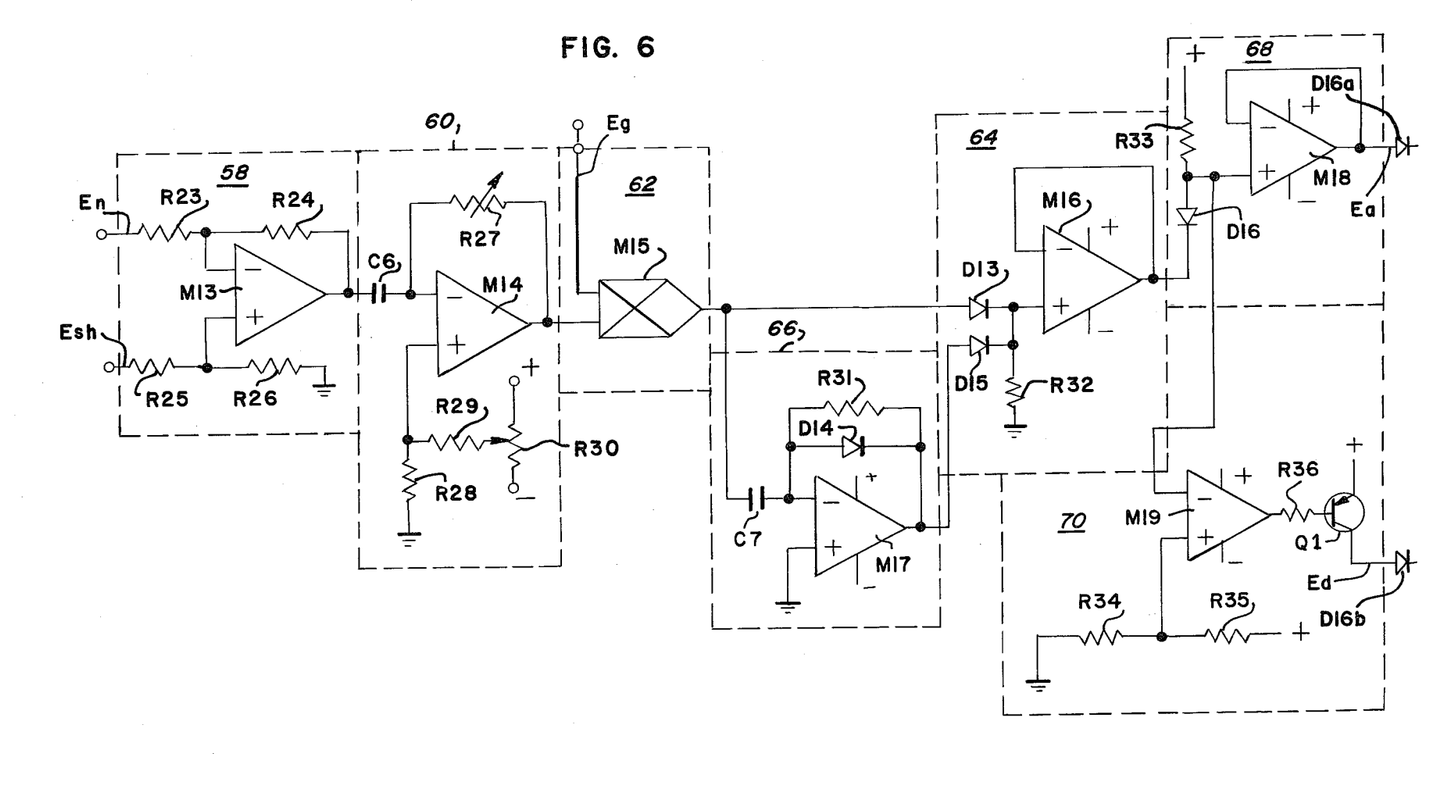
FIG. 6 illustrates one of the wheel slip detection circuits.
Figure 6A:
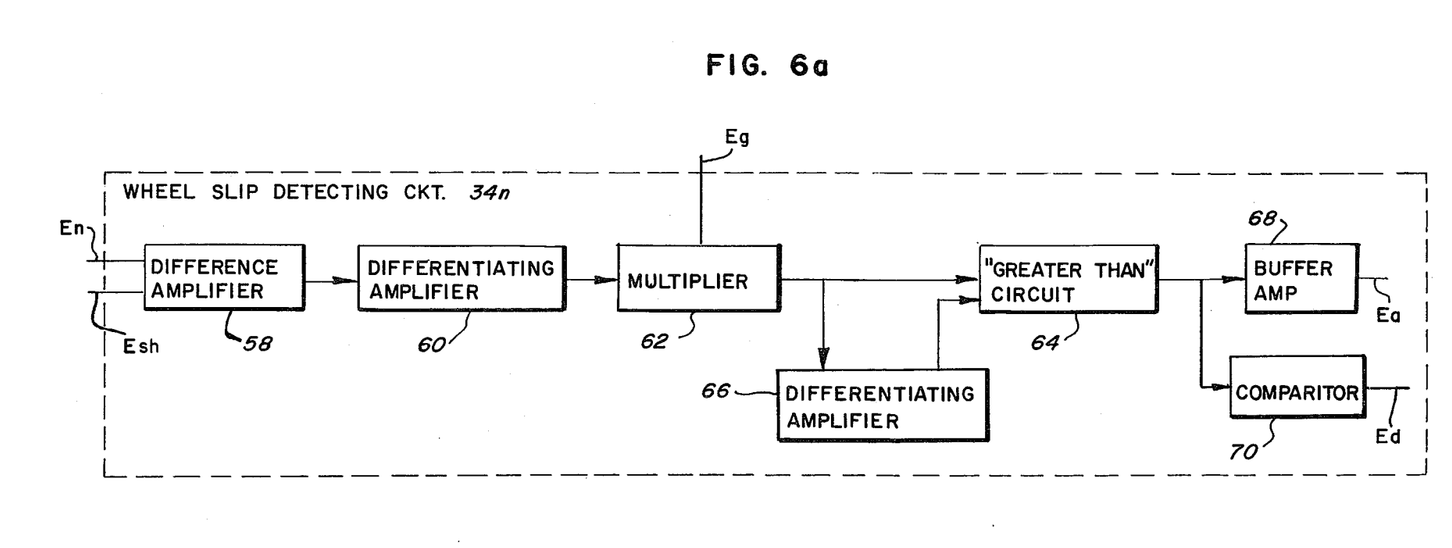
FIG. 6a is a block diagram of the wheel slip detection circuit.

As seen in FIGS. 6 and 6a each Wheel Slip Detecting Circuit 34–34n receives an input from a respective lead E1–En and the respective wheel sensing or instrument circuit 32–32n and from both the gain programmer 40 and the delay and hold circuit 42. Each Wheel Slip Detecting Circuit 34–34n comprises a difference amplifier 58 which receives an input or selected signal on lead Esh from the delay and hold circuit 42 and another input over a respective one of leads E1–En and the respective circuit 32. The difference amplifier 58 feeds a differentiating amplifier 60 to provide an output proportional to wheel slip acceleration $$\frac{d\Omega s}{dt}$$

for application to a multiplier 62. The multiplier 62 also receives an input or selected signal from the gain programmer corresponding to $\Omega a$ over lead Eg and the output of the multiplier corresponding to $$I\Omega a \frac{d\Omega s}{dt}$$

is applied both to a greater than circuit 64 and to a differentiating amplifier 66 which also feeds an inverted signal corresponding to the derivation of $$I\Omega a \frac{d\Omega s}{dt}$$

from the multiplier 62 to the greater than circuit 64 to provide a correction signal. This signal is extended through a buffer amplifier 68 as an analog correction signal corresponding to the desired slip correction and as a digital correction signal from a comparitor 70. The digital correction signal controls the Sand Control Circuit 46 and both relay K1 in the delay and hold circuit and a relay K2 in the override control 48 whenever a slip condition is detected.

The difference amplifier 58 of each wheel slip detector circuit 34–34n includes an inverting amplifier M13 having its negative input terminal connected to a respective one of leads E1–En through a resistor R23 which is also connected to the output of amplifier M13 through a resistor 24. The positive input terminal of amplifier M13 is connected to the junction of resistors R25 and R26 with resistor R26 connected to ground and resistor R25 connected to lead Esh from the delay and hold circuit so the output of amplifier M11 reflects the difference between the output of the respective wheel sensing circuit 32–32n and the train or slow axle speed.

Since amplifier M13 provides an inverted output, this output is transmitted as a negative signal to a differentiating circuit including capacitor C6 and variable resistor R27 in circuit 60. Resistor R27 is connected between negative input terminal and the output terminal of amplifier M14 in the differentiating amplifier 60 and the positive input terminal of amplifier M14 is connected to a voltage divider including resistors R28 and R29 and a variable resistor R30 located between the negative and positive battery. The amplifier M14 reinverts the output of amplifier M13 and provides an output corresponding to wheel slip acceleration $$\frac{d\Omega s}{dt}$$

since its signal represents the differentiated difference between the respective wheel speed represented by a signal on lead E1–En and the train speed represented by the signal on lead Esh.

The output of amplifier M14 is in turn fed to one input of an integrated circuit multiplier M15 in multiplier 62 which may be of the type AD533JD integrated circuit sold by Analog Devices. The other input of the multiplier M15 is derived from lead Eg and the gain programmer which input represents the undifferentiated wheel velocity.

a. The input voltages to the multiplier M15 are conventionally multiplied by each other and divided by a factor such as a ten to provide a wheel slip correction signal representing wheel velocity multiplied by acceleration or $$I\Omega a \frac{d\Omega s}{dt}$$

which in turn is proportional to or represents the power lost in the slipping wheel.

The output of the multiplier M15 is applied through a positively poled diode D13 to the positive input of buffer amplitude M16 in the greater than circuit 64 and is also applied to a differentiating circuit including capacitor C7 and resistor R31. Resistor R31 is shunted by a positively poled diode D14 and is connected between the output terminal and negative input terminal of operational amplifier M17 in the differentiating amplifier 66. Amplifier M17 therefore differentiates and inverts the negative going portion of the output of multiplier M15 when that output starts to fall for maintaining the output to amplifier M16 through diode D15 in parallel with diode D13 so that amplifier M17 functions as an inverting rate detector. Diodes D13 and D15 and the positive terminal of amplifier M16 are also connected to negative battery through resistor R32 so that amplifier M16 normally provides a minimum output if no output or correction signal appears at diodes D13 and D15.

Amplifier M16 in turn feeds the positive input of integrated circuit amplifier M18 in the buffer amplifier 68 and the negative input of amplifier M19 in the comparitor 70 in parallel through diode D16. These inputs normally receive a source potential through resistor R33. Amplifier M18 thus provides an analog voltage output or correction signal proportional to the respective wheel power dissipated, and this signal is transmitted through D16a over lead Ea to the excitation control 44.

Amplifier M19 whose positive input terminal is connected to a voltage divider comprising resistors R34 and R35 transmits a correction signal in response to each signal from amplifier M16 through resistor R36 to the base circuit of a transistor Q1 for enabling the transistor Q1 to transmit a digital output or correction signal through the collector circuit and diode D16b over lead Ed to the sand control circuit 46 for initiating operation of that circuit. The signal on lead Ed is also transmitted to relay K1 in the delay and hold circuit 42 and to relay K2 in the override control 48.

Figure 7:
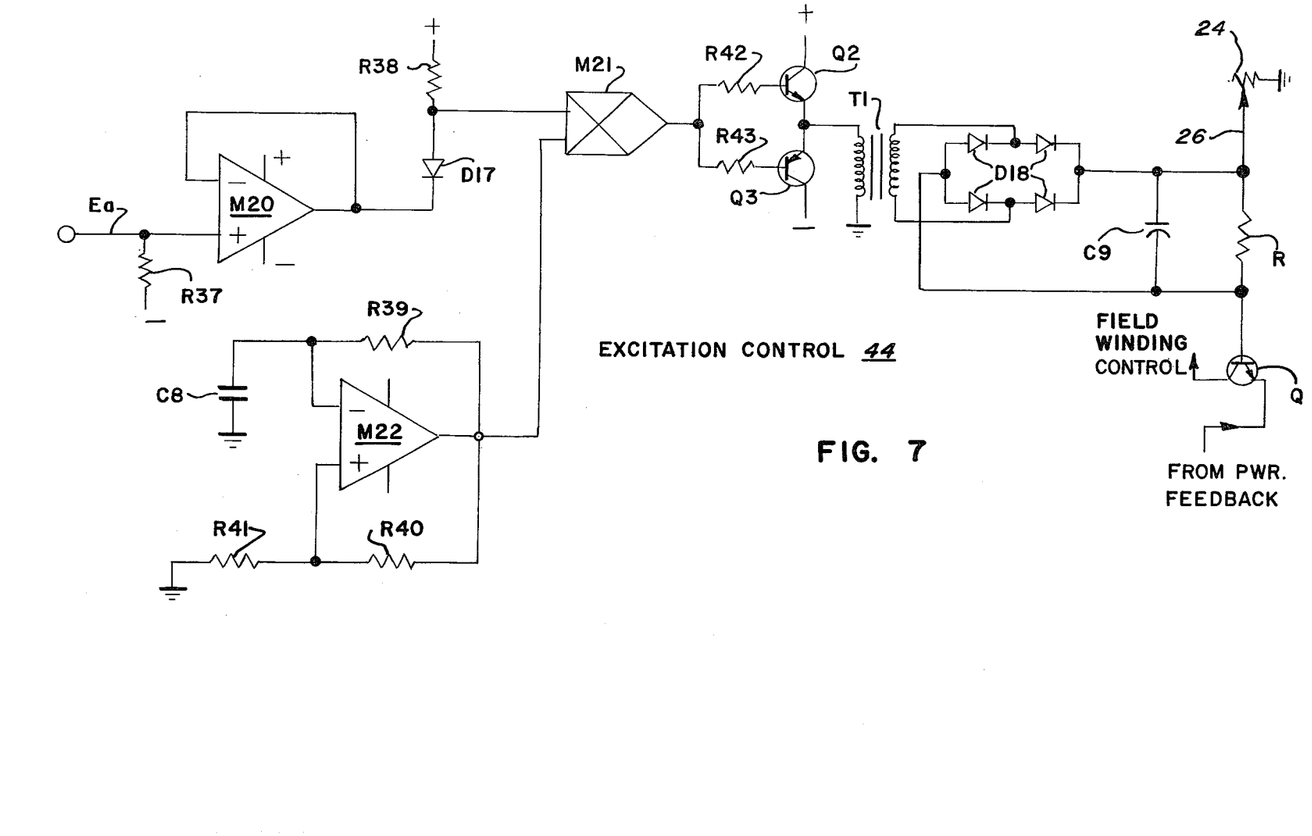
FIG. 7 illustrates the excitation circuit used for controlling the main generator.

The excitation circuit 44 seen in FIG. 7 includes a buffer amplifier M20 whose positive terminal is connected to lead Ea and to negative battery through a resistor R37. The output of amplifier M20 is applied to a negatively poled diode D17 whose anode is connected to positive potential through resistor R38 and to one input of a modulator M21. Modulator M21 may be the same type integrated circuit as multiplier M15. The other input to modulator M21 is supplied from a 1000 cycle per second oscillator M22 having respective resistors R39 and R40 connected between its output terminal and a respective input terminal and a resistor R41 and capacitor C8 connected between a respective input terminal and ground which components are selected to provide the desired frequency.

The modulator M21 supplies the 1000 cycle per second signal, for example, as a carrier modulated by the signal from amplifier M20 through a pair of resistors R42 and R43 each connected to the base circuit of a respective transistor Q2 and Q3. Transistors Q2 and Q3 conduct conventionally through the primary of isolation transformer T1 on alternate half cycles to transmit an AC signal modulated by the signal from amplifier M20 to the secondary of transformer T1. A full wave rectifier comprising diodes D18 and a filter capacitor C9 are provided for by passing the AC from resistor R. The portion of the modulated signal from transformer T1 is connected across resistor R to supply a dc bias potential at the base circuit of transistor Q corresponding to the signal received from lead Ea for controlling the current in the field windings of the main generator 16. The signal from lead Ea, as a practical matter, is subtracted from the signal supplied by potentiometer 24 for controlling the field current in the main generator to reduce the power to the traction motors 18 by a factor corresponding to the analog signal on lead Ea.

Figure 8:
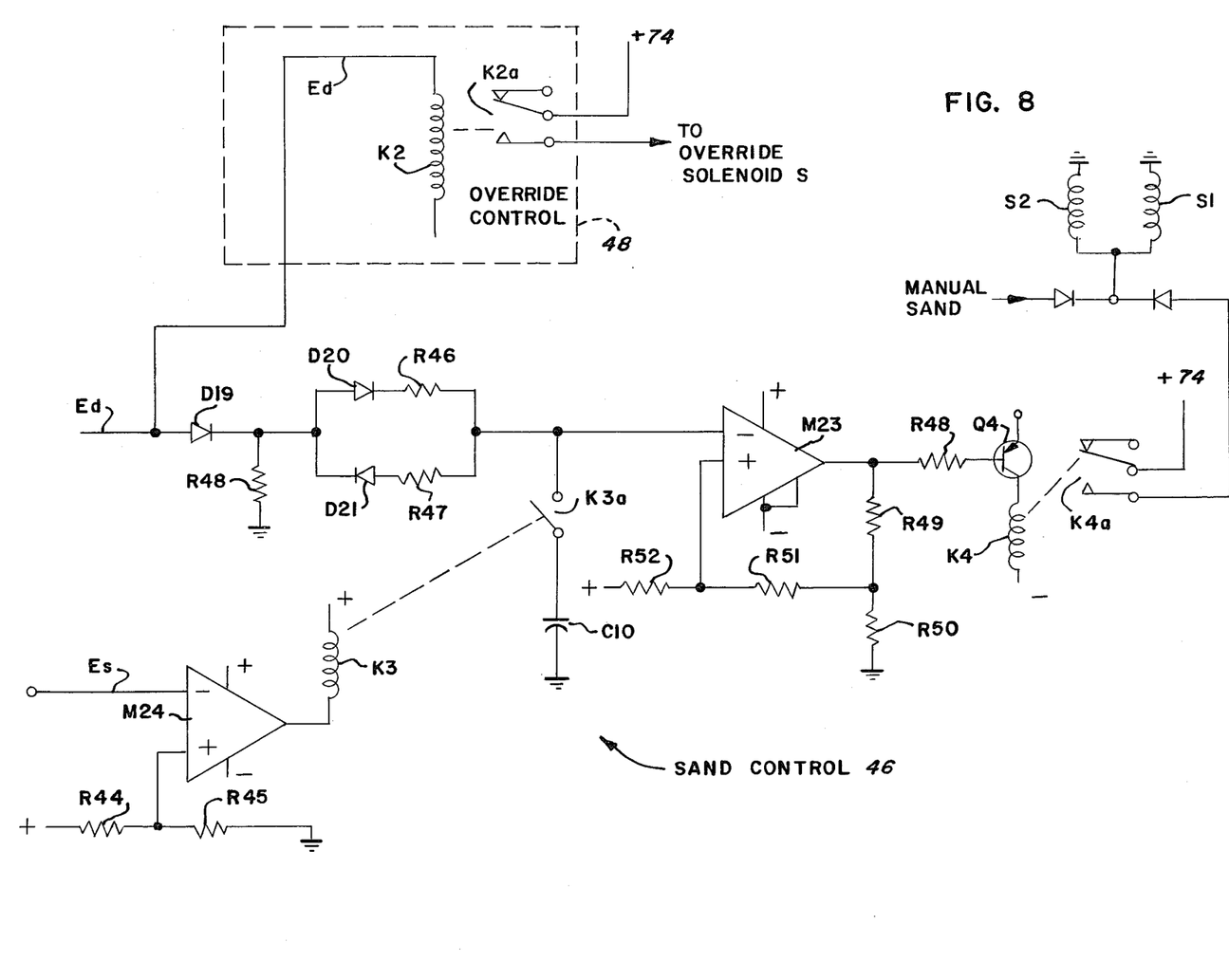
FIG. 8 illustrates the sand control circuit and the override control.
Figure 9A:
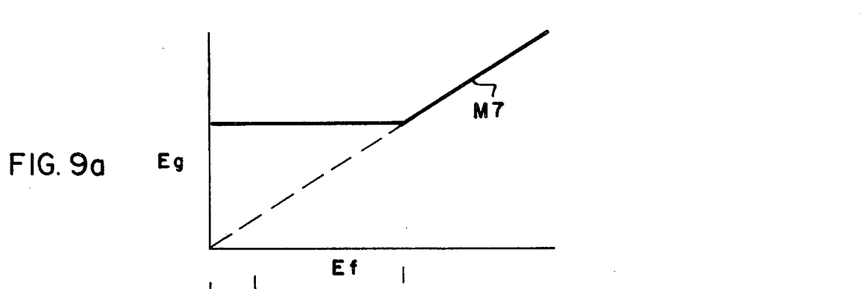
FIG. 9 is a series of graphs illustrating the manner in which wheel slip correction is provided.
Figure 9B:
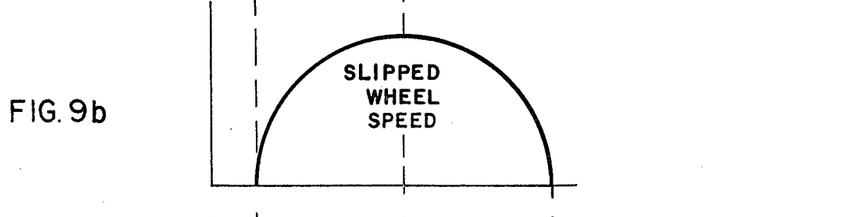
Figure 9C:
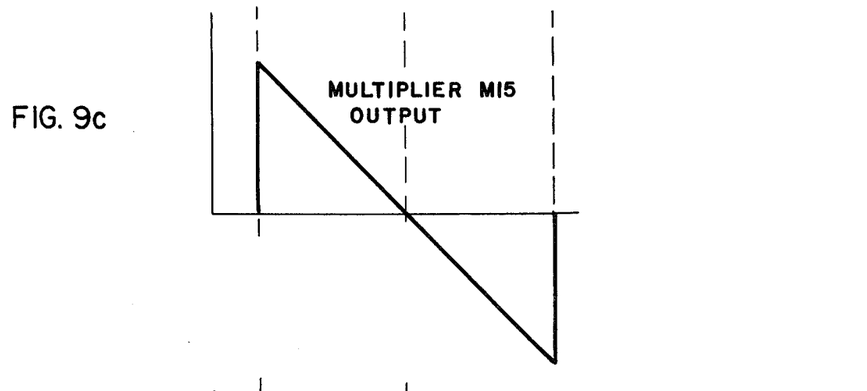
Figure 9D:
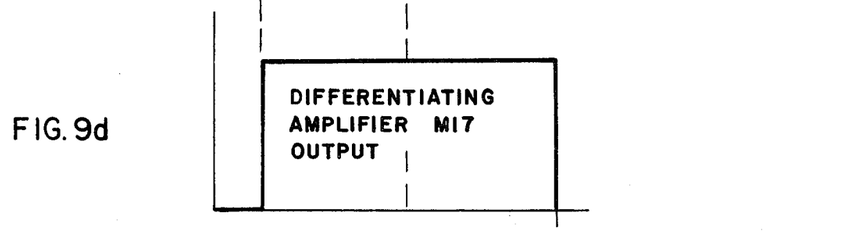
Figure 9E:
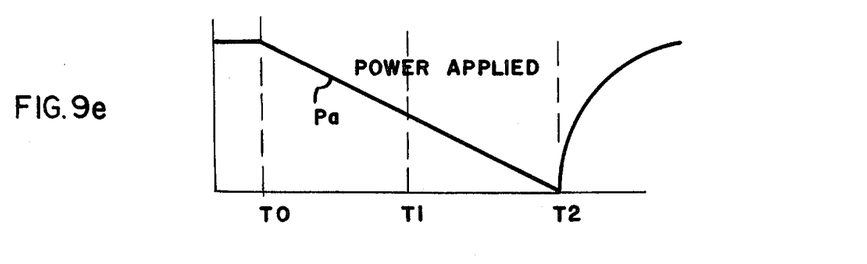

The sand control circuit 46 seen in FIG. 8 comprises a comparator M23 which receives the digital input signal from each wheel slip detection circuit 34-34n over lead Ed and a buffer amplifier M24 which receives an input from lead Es and the slow wheel circuit 38. One input to amplifier M24 is controlled by a voltage divider including resistors R44 and R45 to prevent operation of relay K3 in its output circuit until the output of the slow wheel or slow axle circuit 38 reaches a predetermined value herein chosen to correspond to a train speed of 30 mph, since sanding below this speed is usually necessary for each wheel slip and only sometimes necessary above this speed. When relay K3 operates it connects a capacitor C10 to resistor R46 which is connected to the negative input of amplifier M23. The capacitor C10 delays the application of the signal from lead Ed through series connected positively poled diodes D19 and D20 to the negative input of amplifier M23 in the event the locomotive is travelling over 30 mph. A discharge circuit including a large resistor R47 and diode D21 which are connected to ground through resistor R48 at the junction of diodes D19 and D20 serves to discharge capacitor C10.

The amplifier M23 is an integrated circuit type LM311 sold by National Semiconductor Co. and turns on and off in response to signal changes on lead Ed to change the bias level at transistor Q4 through resistor R48. When transistor Q4 conducts, it operates relay K4 to energize the appropriate sanding air solenoids such as S1 and S2 through contacts K4a, or it may operate a timed delay circuit on the locomotive for operating the sanding solenoids. Amplifier M23 is provided with a hysterysis effect by resistors R49 and R50 connected through a divider including resistors R51 and R52 to the positive input terminal of amplifier M23. Amplifier 23 therefore turns transistor Q4 off at a lower signal level than that required to turn it on to ensure that the sanding solenoids maintain a sanding condition as they may take as long as 0.7 of a second to dispense the sand to the track, after energization.

When the capacitor C10 is connected to amplifier M23 the output of the amplifier or comparitor M23 is delayed until the occurrence of a repetitive slip condition is detected by the charge build-up on capacitor C10 assuming these occur in a time period less than that required to discharge the capacitor C10 through resistor R47. In the case of repetitive slip, amplifier M23 will also operate relay K4 to, in turn, operate the sanding solenoids.

The signal on lead Ed is also applied to relay K2 in the control circuit 48 to operate that relay. At contacts K2a relay K2 operates the override solenoid S to override the governor 22 and drive the potentiometer arm 26 in a direction for reducing the load of the field windings of generator 16 on engine 12 and to reduce the power output to the traction motors. Operation of arm 26 by solenoid S requires a relatively long time period, however, since the movement is hydraulically controlled, and in the meantime the appropriate signal is transmitted from the excitation control 44 and applied across resistor R to the base circuit of the transistor Q. Operation of the override solenoid may be appropriately delayed through a delay circuit, if desired.

WHEEL SLIP CORRECTION OPERATION

The engineer to operate the locomotive selects a particular power setting for the engine whereafter the diesel engine 12 is operated in accordance with the setting under control of governor 22 to drive the main generator 16 and supply electric power for energizing the traction motors 18. Motors 18 each drive or rotate a respective wheel to move the locomotive or train. As the energy required by the traction motors 18 varies the load placed on the main generator 16 and engine 12 will vary accordingly. Thus as the load goes down the governor 22 controls the load regulator potentiometer arm 26 in one direction to maintain a constant torque and the fuel supply to operate the engine at a constant rpm. If the load goes up, arm 26 and fuel supply 14 are controlled in the opposite direction so that the engine 12 operates as a relatively constant power source. Since the action of the governor takes place through a hydraulic system the response time is quite slow whereas the excitation control circuit creates immediate response of the field current to the necessary power condition.

Each gear 52 rotates in synchronism with the respective axle or wheel in response to the energization of the respective traction motor 18 and generates a series of sine waves or pulses in the associated coil 54 of the pick-up assembly 50 at a rate directly proportional to the axle rpm. These pulses are transmitted to the respective sensing circuit 32–32n, which function as frequency to voltage converters. At the respective sensing circuit 32, for example, the pulses are transmitted through resistor R1 and integrated at capacitor C1. The amplifier M1 provides a series of square wave pulses to the differentiating circuit formed by resistor R6 and capacitor C2. The pulses are differentiated and applied to amplifier M2 which furnishes a positive dc potential on lead E1 whose positive value is proportional to or rises with increasing speed of the respective wheel. This signal is transmitted over lead E1 to the respective wheel slip detection circuit 34 and to both the fast and slow wheel circuits 36 and 38.

Diodes D5–D5n at circuit 36 transmit the corresponding voltage to the input of amplifier M3 while the voltage at the input of amplifier M5 rises to the corresponding value in response to the potential change at diodes D6–D6n so that both amplifiers transmit an output corresponding to the input from each lead E1–En unless the signal on one of those leads should vary from the others. The output from amplifiers M4 and M6 follow that from amplifiers M3 and M5 respectively and they transmit a positive signal proportional to train speed over leads Ef and Es respectively. This voltage will of course rise and fall with train speed and is applied to the gain programmer 40 and to the delay and hold circuit 42 respectively.

At the gain programmer the signal applied to amplifier M7 is ineffective to vary the output of amplifiers M9 and M10 until the train speed reaches a predetermined value and at that time amplifier M7 provides an output greater than that supplied by amplifier M8. The initial condition representing the output of amplifier M9 is therefore a constant as shown in graph a of FIG. 9 by the line Eg. As the train speed rises above the predetermined value the output of amplifier M10 goes up as shown by the diagonal line M7 in graph a of FIG. 9. The output of amplifier M10 is applied over lead Eg to one input terminal of multiplier M15. It will be appreciated that for certain types of locomotives the amplifier M8 may be omitted since the constant output signal shown at Eg in FIG. 9 is provided to compensate for the power lmiting feature in the power settings selected for certain types of locomotives operating at low speeds.

If a slip condition should occur of course the input voltage from the respective sensing circuit 32–32n to the fast wheel circuit 36 will rise since the respective wheel will travel faster than the others and the output supplied by amplifier M10 rises accordingly and this may occur from the portion marked Eg.

In the meantime assuming no wheel slip has occurred, the slow wheel signal applied to amplifier M11 from lead Es and the slow wheel circuit 38 is stored at capacitor C5. The output of amplifier M12 follows that signal after the short delay to transmit the signal over lead Esh to the input of amplifier M13 in each wheel slip detection circuit 34–34n. The other input to amplifier M13 is supplied from the respective instrument or wheel sensing circuit 32–32n as described.

The output of amplifier M13 therefore remains at substantially zero as any significant change in wheel speed in response to normal acceleration or deceleration takes at least two seconds and therefore both inputs to amplifier M13 rise and fall substantially together in response to changes that occur in normal train operation.

The differentiating circuit comprising capacitor C6 and resistor R27 receive and transmit a substantially zero input to amplifier M14, which forwards a zero input to multiplier M15. Any rising voltage from the gain programmer such as shown at portion marked M7 in graph a of FIG. 9 is then indicating a rising train speed and when applied to multiplier 15 in conjunction with the zero input from amplifier M14 provides a substantially zero output to amplifiers M16 and M17 so that the output of amplifiers M18 and M19 remains minimum, as shown to the left of the line TO in FIG. 9.

The excitation control 44 therefore provides no output for controlling transistor Q and the field windings of the main generator 16 remain under control of the load regulator potentiometer 24 and the governor 22.

The override relay K2 in the control circuit 48 remains unoperated, as do relays K1 and K4 in the delay and hold circuit 42 and the sand control circuit 46, respectively. Relay K3 operates whenever the train speed goes over the chosen value of, for example, 30 mph in response to the increased signal level in lead Es from the slow wheel circuit 38.

In a slip condition, one of the wheels travels faster than the others, as already explained. Its velocity moves above train speed in response to the increase in acceleration as indicated at time TO in graph b in FIG. 9. This condition is indicated by a change in the signal level on a respective one of the leads E1–En and that signal level rises above the others. This signal is transmitted over the respective lead E1 for example, to amplifier M13 in the respective wheel slip detecting circuit 34 and to the respective diode D5 among diodes D5–D5n and to diode D6 among diodes D6–D6n.

At the slow wheel circuit 38 the voltage supplied to amplifier M5 remains substantially constant, since the other wheel sensing circuits are maintaining the train speed potential at the input to amplifier M5. The output from the amplifier M6 to the delay and hold circuit 42 therefore remains at its previous level as does the input to each amplifier M13 from lead Esh. However, at both amplifiers M3 and M13 the signal level follows the output of the slipping wheel sensing circuit 32. Amplifier M4 therefore delivers a rising output to the gain programmer 40, while amplifier M13 delivers a rising signal to the differentiating amplifier M14, as already explained, which supplies a differentiated pulse to multiplier M15.

At the gain programmer the signal corresponding to the slipping wheel is transmitted to amplifier M7. It will be appreciated that in effect an output is continuously provided from the gain programmer to the multiplier M15 and that its value is merely changed under certain circumstances to provide an output corresponding both to train speed and wheel speed. If desired, the signal from the slow wheel circuit may be used so that either the fast or slow wheel circuits may provide a selected signal indicating wheel speed.

The output of the amplifier M15 in response to a differentiated output from amplifier M14 is therefore a signal proportional to the velocity $\Omega a \times$ acceleration $$\frac{d\Omega s}{dt}$$

and this control or correction signal is applied to both the amplifier M16 through diode D13 and to the differentiating amplifier M17 as indicated by the positive going portion adjacent time TO of graph c in FIG. 9. The amplifier M16 supplies this correction or control signal to amplifiers M18 and M19.

Amplifier M19 responds by providing a digital signal on lead Ed to operate the override relay K2 in the Control Circuit 48. The signal on lead Ed is also transmitted through diodes D19 and D20 to the input of amplifier M23, which now renders transistor Q4 conductive for energizing relay K4 and relay K4 energizes the sanding solenoids S1 and S2 to drop sand on the track and increase the value of Pte. If relay K3 is operated, the signal to amplifier M23 is delayed by storage in capacitor C10. If the slip condition or correction signal is repeated, before capacitor C10 discharges through resistor R47, the amplifier M23 is effective to energize relay K4. This condition is provided as previously mentioned to avoid the application of sand, if not needed, such as momentary wheel slips at higher train speeds.

At the delay and hold circuit 42 the relay K1 opens the circuit between resistor R21 and capacitor C5 at contacts K1a so that capacitor C5 retains the charge or signal corresponding to train speed in the event the other wheels should go into a slip condition and it thereby retains the proper reference potential at one input to amplifier M13 in each wheel slip detecting circuit.

Relay K2 operates the override solenoid S, which starts to drive the potentiometer arm 26 toward a minimum load condition.

The analog output or correction signal from amplifier M18 is transmitted to amplifier M20 in the excitation control for modulating the 1000 cycle per second signal from oscillator M22 at modulator M21, and this signal is then applied through transformer T1 and the full wave rectifier to set the voltage across resistor R proportional to the desired power reduction. The bias level at the base circuit of transistor Q follows this signal. Transistor Q therefore conducts at a rate for controlling the current through the field windings of the main generator to reduce the power output to the traction motors. The analog output or correction signal, may of course, be applied instead to the traction motor of any slipping wheel to reduce the power output of that motor only, if so desired, thereby avoiding a reduction in power to the non-slipping wheels.

With the power being applied to the wheels reduced, the acceleration of the slipping wheel starts to fall; however, its velocity may still be increasing until at time T1 it is at zero acceleration and maximum velocity as shown in graph b of FIG. 9.

After the differentiated pulse is transmitted through amplifier M14 the output of amplifier M14 starts to fall, and as it does so the output of multiplier M15 begins to move in a negative direction as shown in graph c of FIG. 9 and after time T1 when the slipping wheel is at maximum velocity the output of multiplier M15 goes negative. The inverting rate detector amplifier M17 responds to the multiplier output by providing a positive output signal through diode D15 to amplifier M16 as shown by graph d in FIG. 9 for maintaining the output or correction signal from amplifiers M18 and M19. The profile of the falling portion of the curve shown in graph c and the straight line portion in graph d may of course vary as the wheel responds to momentary conditions. With the correction signal being maintained by the amplifiers M18 and M19, the available power supplied to the traction motors continues to fall as shown by curve Pa in graph 3 in FIG. 9, while the energization of the override solenoid S, relay K1 and the sanding solenoids S1 and S2 is maintained.

As the wheel decelerates in response to the drop in engine power it starts to accelerate in a negative direction as shown in graph b in FIG. 9 between times T1 and T2 and at time T2 the wheel reaches train speed. The output of multiplier M15 therefore continues to fall or move in a negative direction; however, the differentiating or inverting rate amplifier M17 continues to maintain a positive output to amplifier M16 in response to the negative going signal from the multiplier M15. This maintains the override relay together with relay K1 and the sanding solenoids energized, while the excitation circuit 44 continues to control or reduce the power available Pa to the traction motors as shown by graph e.

When the accelerated or slipping wheel or wheels reach train speed at time T2, the output of the respective sensing circuit 32 on lead E1 falls to the level of lead Esh and the output of differentiating circuit amplifier M14 reverses direction, causing the output of multiplier M15 to move rapidly in a positive direction to zero as shown at time T2 in graph c in FIG. 9. The output of the amplifier M17 also falls at this time since diode D14 shunts the pulse from the multiplier M15 and the output from amplifiers M16, M18 and M19 return to normal to restore relays K1 and K2 and to remove the excitation circuit signal from the base circuit of transistor Q. With relay K2 restored the override solenoid S is restored and the governor resumes control the power output Pa, which starts to rise towards normal as shown to the right of time T2 in graph e of FIG. 9.

If all four wheels had gone into slip, the capacitor C5 retains the train speed signal on lead Esh since relay K1 is operated. Each wheel slip detecting circuit 34–34n then provides an output to the excitation control and to relays K1, K2, and K4, and these restore only when all four wheels are brought back to train speed, since only at that time does the signal on the respective lead E1--En correspond to that on lead Esh. This correction of the worst slip condition corrects all slipping wheels.

If relay K3 had been operated during the slip correction procedure, contacts K3a are closed to delay the output of amplifier M23 for operating relay K4. This feature is optional and is provided in the event the train is operating above a predetermined speed, since the sanding operation may then be desirable only in the event slip is repetitive or continuous.

It will be appreciated by those skilled in the art that the output of the differentiating rate detector M17 responds to the deceleration occurring when the wheel speed moves in a negative direction back to train speed and that this feature is also utilized for detecting and correcting a wheel slide while the locomotive is in a dynamic braking mode of operation.

It will also be appreciated that since each correction signal is individual to the respective slipping wheel that the correction signal may be utilized for controlling the power output of the individual traction motor 18 instead of simply reducing the power output of the main generator.

The foregoing constitutes a description of an improved and more economical wheel slip correction method or system and although described with certain electrical and/or electronic components, it will be understood that there are other techniques or apparatus which fall within the concepts of the invention, as set forth in the accompanying claims.

What is claimed is:

1. An improved system for correcting wheel slip between any one of a plurality of locomotive wheels and a track occurring in response to the application of power to said wheels for rotating said wheels along a track to move the locomotive relative said track, the improvement comprising:
   means common to said wheels for deriving a first signal proportional to locomotive speed;
   means controlled by said first signal for deriving a respective correction signal for each wheel proportional to the power dissipated by the respective wheel in response to a slip condition of the respective wheel;
   means for utilizing each correction signal for controlling the slip condition of the respective wheel to eliminate the slip; and
   memory means operated by said correction signal for retaining said first signal until said slip condition is eliminated.

2. The system claimed in claim 1 in which each correction signal is independent of a correction signal generated in response to a slip condition of another wheel.

3. An improved method for correcting wheel slip occurring in response to the application of power to a vehicle wheel for rotating said vehicle wheel along a surface engaged with said wheel to move the vehicle synchronously with said wheel relative said surface, the improvement comprising the steps of:
   deriving the power loss of the slipping wheel, said power loss comprising the power to a wheel's axle minus the power used in tractive effort;
   producing a control signal representing said power loss; and
   utilizing said control signal to control the power applied to the vehicle, for correcting the wheel slip.

4. The method of claim 3 wherein the step of deriving the power loss includes the steps of:
   deriving the speed of the axle;
   deriving the acceleration of the axle from the speed thereof; and
   multiplying the speed of the axle times the acceleration of the axle times the moment of inertia of the axle.

5. The method of claim 3 wherein the vehicle has a main power generator control system and the step of utilizing said control signal comprises the step of applying said control signal to said main power generator to reduce the power output therefrom.

6. The method of claim 3 wherein said wheel slip occurs as a result of the application of power to a vehicle wheel in an effort to accelerate the vehicle.

7. The method of claim 3 wherein said wheel slip occurs as a result of the application of power to a vehicle wheel in an effort to decelerate the vehicle.

8. The method of claim 3 wherein the step of deriving the power loss of the slipping wheel is continuous.

9. The method of claim 3 wherein the step of utilizing said control signal to control the power applied to the vehicle occurs automatically.

10. The method of claim 4 including the step of storing a signal corresponding to the speed of an axle which is not slipping.

11. The method of claim 3 including the step of applying a material such as sand to increase the friction between the wheel and the surface engaged with said wheel in response to the control signal.

12. The method of claim 4 wherein the moment of inertia is adjustable to correspond with the moment of inertia of different vehicles.

13. A system for correcting wheel slip occurring in response to the application of power to a vehicle wheel for rotating said vehicle wheel along a surface engaged with said wheel to move the vehicle synchronously with said wheel relative said surface, the improvement comprising:
   means for deriving the power loss of the slipping wheel, said power loss being the power to a wheel's axle minus the power used in tractive effort;
   means to produce a control signal representative of said power loss; and
   means for utilizing said control signal to control the power applied to the vehicle, for correcting the wheel slip.

14. The invention of claim 13 wherein the means for deriving the power loss comprises means for determining axle speed; means for deriving the axle's acceleration from said axle's speed; and means for multiplying axle speed times axle acceleration times the axle's moment of inertia, the resulting output representing power loss.

15. The invention of claim 13 wherein said means utilizing the control signal to control the power applied to the vehicle comprises control circuitry which proportionately increases or decreases the power being applied to the vehicle in response to said control signal.

16. The invention of claim 14 further comprising memory means for retaining the axle speed until the slip condition is eliminated.

17. The invention of claim 13 further comprising means for applying a material such as sand to increase the friction between the wheel and the surface engaged with said wheel in response to said control signal.

* * * * *